United States Patent Office 3,349,243
Patented Oct. 24, 1967

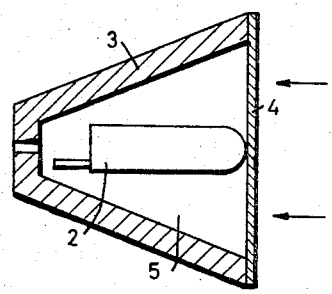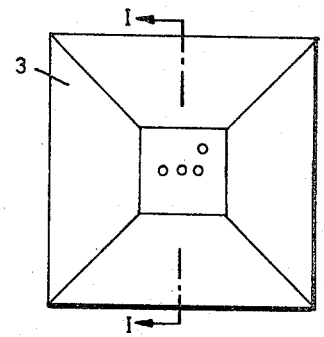
FIG. 1    FIG. 1a
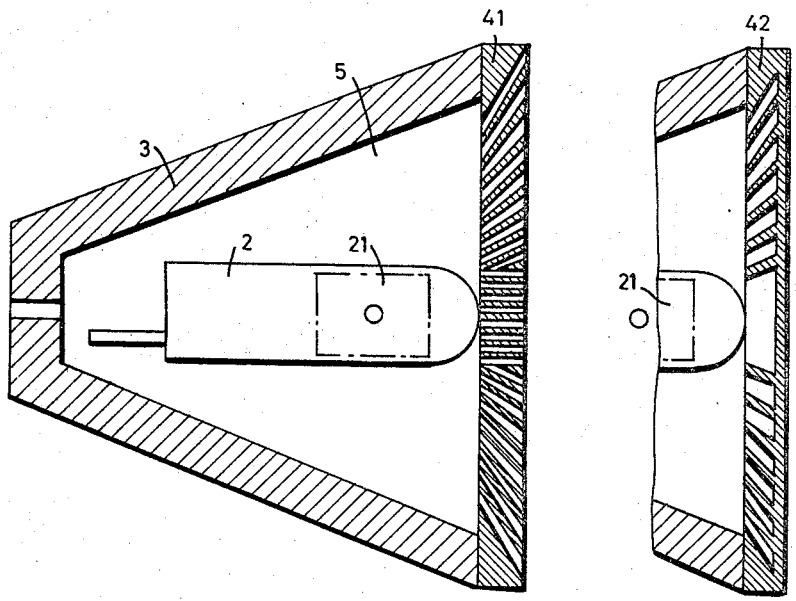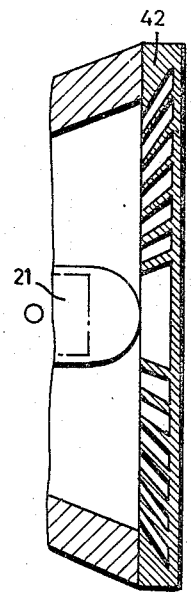
FIG. 2    FIG. 3

3,349,243
DEVICE FOR MEASURING NEUTRON CURRENT
DENSITIES HAVING A CONCAVE NEUTRON
REFLECTOR
Karl Janner, Erlangen, Germany, assignor to Siemens-Schuckertwerke Aktiengesellschaft, Berlin - Siemensstadt, Germany, a corporation of Germany
Filed Dec. 4, 1963, Ser. No. 327,951
Claims priority, application Germany, Dec. 7, 1962, S 82,760
5 Claims. (Cl. 250—83.1)

My invention relates to devices for measuring neutron current densities, and particularly to such devices for measuring these densities in nuclear reactors.

Generally devices of this type include an ionization chamber or other measuring probe, (for example the type described in U.S. Patent No. 2,936,373, of Welker et al.) which is embedded in, or surrounded by, a moderator substance. However, the sensitivity of such measuring devices is inadequate for many purposes, especially where a given neutron spectrum is to be sensed. The term "sensitivity" denotes the ratio of output signal value, i.e., the ionization chamber current or the pulse rate of a counting tube, to the neutron current density of the measuring point, the measuring head being remote therefrom.

Also the sensitivity was affected by the spatial dimensions of the measuring device, briefly called the "measuring head," which heretofore had to be relatively large and, therefore, also rather expensive for adequate sensitivity.

An object of this invention is to provide an improved measuring device of the aforementioned type and more specifically a measuring device wherein these shortcomings are considerably reduced or obviated.

According to a feature of my invention, a plate made of moderator material, whose thickness depends on the velocity spectrum of the neutrons, is located on the radiation entrance side of a measuring probe, while surrounding the other sides of the measuring probe, and separated from the probe by an air space, is a neutron reflector, preferably covered on the outside by a layer of absorbent material.

Thus, as compared to other neutron measuring devices, the sensor proper is no longer surrounded by moderator substance nor embedded in it. This permits a smaller head. Moreover, the sensitivity of these relatively small measuring heads is greater than that of moderator-filled devices of equal spatial dimensions. This is because the thinner moderator layer impairs the ratio of the useful effect of moderation to the weakening of the thermal neutron flux by reflection and absorption. This transition is, of course, stepless and continuous, and also depends on the type of moderator, on the shape of the measuring head, as well as on the energy of the impinging neutrons.

These and other features of the invention are pointed out in the claims forming a part of the present specification. Other objects and advantages of the invention will become obvious from the following detailed description when read in light of the accompanying drawings. However, it will be obvious to those skilled in the art that the invention may be embodied otherwise than hereinafter disclosed. In the drawings:

FIG. 1 is a sectional view of a measuring head embodying features of the invention, namely a section I—I of FIG. 1a.

FIG. 1a is an elevation of the measuring head in FIG. 1.

FIG. 2 is a sectional view of another measuring head according to the invention.

FIG. 3 is a sectional view of a portion of another measuring head similar to FIG. 2, and embodying features of the invention.

Figure 6:
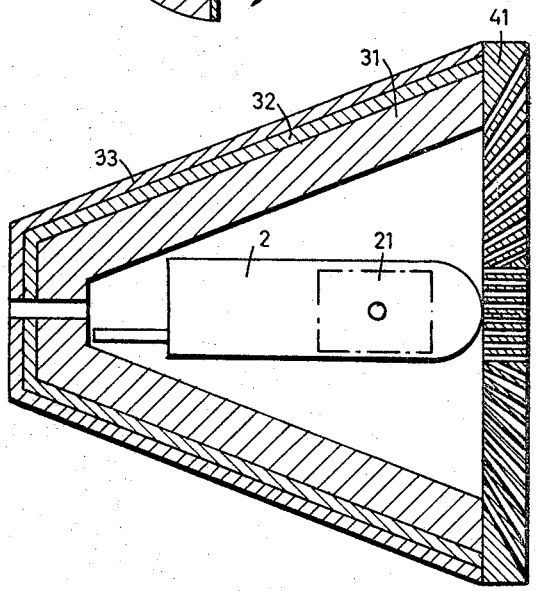
FIG. 6 is a sectional view of still another measuring head embodying features of the invention.

According to FIGS. 1 and 1a a radiation sensor 2, having the necessary connectors, is coaxially mounted by suitable means within a hollow air-filled paraffin reflector 3 of truncated pyramidal shape which is in turn enclosed at its base, the radiation entrance area, by a polyethylene radiation-moderator (radiation entrance) plate 4. The sensor 2 may be composed of or may constitute an ionization chamber, a counting tube, or a radiation counter of the type described in U.S. Patent No. 2,936,373 of Welker et al., assigned to the assignee of this application. The sensor or sensing probe 2 has its sensitive portion concentrated in a volume which is shown by the broken lines 21 (FIGS. 2, 3 and 6). Air fills the intermediate space between sensor 2 and the paraffin reflector 3.

The radiation entrance plate 4 capping the base of the truncated reflector 3 has an entrance surface of approximately 300 by 300 millimeters. The reflector has a pyramid depth of 360 millimeters and a reflector thickness of approximately 35 millimeters. The measuring probe, coaxial with the pyramid, is arranged close to the radiation entrance wall 4.

In operation, the measuring head of FIGS. 1 and 1a is arranged with its base plate 4 facing the propagating direction of neutron radiation. Moderation of the fast neutrons takes place in the moderator plate 4 over the radiation entrance area of the measuring head, as well as in the reflector 3 surrounding the sensor 2 with air clearance. This measuring head having no moderator fill exhibits a sensitivity greater than that of comparable measuring heads having moderator filling and having a radiation entrance area approximately 300 x 300 mm. The polyethylene moderator plate 4 on the radiation entrance side is considerably more permeable to fast neutrons than slow ones, partly because the small atomic weight of hydrogen will cause fast neutrons predominantly to spread in the forward direction and partly because the spread cross section increases greatly as the neutron speed decreases. Thus, if the moderator layer is sufficiently thick, the fast neutrons will be reflected considerably less than those neutrons which reach the entrance layer from the interior of the measuring head, since the latter slow neutrons have a considerably smaller energy content. This creates a trap effect, favoring the entrance of the neutrons into the measuring head compared to their exit. As a result the sensitivity of the measuring head increases.

The measuring head may be prism shaped. However, the truncated pyramidal shape of FIGS. 1 and 1a (as well as the truncated conical shape to be discussed hereafter)

is particularly suitable for small measuring heads. There the sensitivity is further increased because the sources of thermal neutrons come closer to the sensitive volume 21 of the sensor 2, so that it is more probable that the neutrons will reach this sensitive volume.

In FIG. 2 the reflector 3 is in the shape of a truncated cone (although it will be recognized that a truncated pyramid is also applicable here). The device of FIG. 2 is otherwise the same as that of FIG. 1 except that the moderator plate 41 is perforated on the radiation entrance with symmetrical bores all pointing toward the sensitive volume 21.

In FIG. 3 the measuring head otherwise corresponds to FIG. 2 except that the radiation entrance plate 42 possesses blind indentations in the shape of annular grooves all converging toward the sensitive volume 21.

Figure 4:
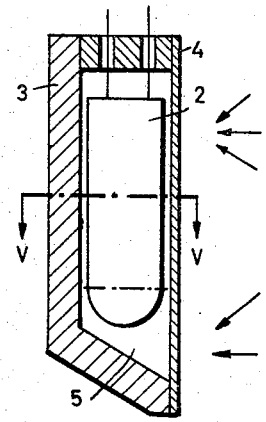
FIG. 4 is a sectional view of still another embodiment according to the invention and constitutes the section IV—IV of FIG. 5.
Figure 5:
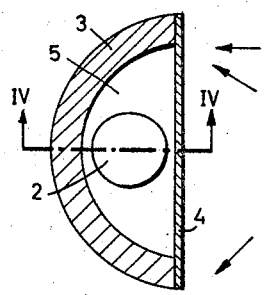
FIG. 5 is a section V—V of FIG. 4.

The measuring head may also have a cylindrical or prismatic shape. A semicylindrical head is shown in FIGS. 4 and 5. Here the measuring head, similar to FIGS. 1 and 1a, is comprised of a truncated semicylindrical reflector 3 of paraffin having a paraffin base through which connectors pass to a measuring probe, for example an ionization chamber or a counter or a device as in the before-mentioned patent. A polyethylene radiation entrance plate 4 is secured across the diameter of the semicircular cylinder, and the probe 2 is parallel to the axis of the cylinder within the air space 5 of the cylinder. The moderator plate 4 is shown solid, but may have the perforations associated with FIGS. 2 and 3, namely those of members 41 and 42.

For increased reflection ability or for better stability as to shape, the reflector may consist of several layers; for example, the outer layer can consist of polyethylene and the inner layer of beryllium.

FIG. 6 illustrates such a measuring head. A reflector composed of a multitude of layers 31, 32 and 33 is capped by a moderator plate 41 corresponding to the plate 41 in FIG. 2. The reflector is in the shape of a truncated cone although a truncated pyramid is also contemplated. Coaxial with the conical shape of the reflector and within the air space of the reflector is the sensing probe 2 having a sensitive volume 21. The layers in the conical reflector are preferably as follows. Layer 31 is made of beryllium, layer 32 of polystyrol, and layer 33 of polyethylene. The composition of the latter layers may be reversed.

The optimum thickness of the hydrogen containing moderator plate on the radiation entrance side of the measuring head for maximum sensitivity, depends on the energy spectrum of the neutrons to be responded to, and also on the layer-material itself. The best for polyethylene moderating fission-neutrons is about 15 mm. With neutrons of this type having this energy distribution, when the layer-thickness is increased, the sensitivity of the measuring head is impaired because of the added absorption in the front plate; when the layer-thickness is decreased, the sensitivity is impaired because of increased absorption in the reflector walls 3, due to a deeper penetration of the neutrons.

If the moderator plate shown in FIGS. 2 or 3 is constructed with a different, but symmetrical wall-thickness distribution, further increase in the sensitivity for ascertaining fission neutrons prevails. The sensitivity (measuring range), the dependence of the measuring head's sensitivity upon the neutron energy, i.e., the spectral sensitivity, and the directional dependence are influenced by the thicknesses of the perforated and solid parts of the moderator plate 41 or 42, the ratio of the perforated or grooved surface to the remaining surface of the polyethylene plate, and the shape and size of the perforations. The maximum sensitivity to thermal neutrons and the minimum sensitivity to high-energy neutrons are obtained by complete elimination of the moderator plate at the radiation entrance area. A perforated moderator plate (41 in FIG. 2) impairs the sensitivity to low energy neutrons and increases the sensitivity to high energy neutrons, as the open cross section of the front plate decreases and as the thickness of the plate increases. The directional dependence of the sensitivity increases, when the plate has round or square perforations, or annular grooves, as the ratio of the perforation depth to the cross section of the perforations increases. The above applies as well for the measuring heads illustrated in FIGS. 4 and 5.

These measuring heads also have the advantage that their ratio of the neutron sensitivity to spurious-radiation sensitivity is greater than those of prior heads having the same entrance area. This is so because the neutron sensitivity of the new head has increased relative to prior heads whereas sensitivity to the spurious radiation, either entering from the front or originating in the measuring probe, remains constant. Of course, spurious radiation entering from other sides can be shielded by known means such as surrounding the reflector layer 3 on the outside with a shielding, such as lead, as well as with an absorption jacket. The invention contemplates such shielding.

Measuring heads according to the invention have the advantage that considerably smaller sizes are at least as sensitive as known larger measuring heads with embedded measuring probes. In other words, the spatial decrease of the new measuring head, produces an increase in the sensitivity as compared with a moderator-filled head of equal size, and equal entrance area.

Also measuring heads according to the invention exhibit an increase in the sensitivity ratio of neutron- to spurious-radiation; better adaptability of the sensitivity to the neutron spectrum, and only minor weakening of the supporting capacity of the reactor shield, if the measuring head is built into such a shield, because the radiation entrance area is much smaller than in conventional measuring heads of comparable sensitivity.

In operation, the heads according to the invention may be used much the same as ordinary heads by directing the entrance area to oncoming rays, and may be similarly connected.

I claim:

1. A device for measuring neutron current densities of a determined neutron spectrum, comprising a measuring probe responsive to impinging neutrons, a plate made of moderator material and located on one side of the measuring probe, and a concave neutron reflector forming with said plate a chamber surrounding said probe and spaced from said probe by air, said reflector having the shape of a hollow thick-walled truncated cone, the base of said cone being open and engaging at its periphery said plate of moderator material.

2. A device for measuring neutron current densities of a determined neutron spectrum, comprising a measuring probe responsive to impinging neutrons, a plate made of moderator material and located on one side of the measuring probe, and a concave neutron reflector forming with said plate a chamber surrounding said probe and spaced from said probe by air, said reflector having the shape of a hollow thick-walled truncated pyramid, the base of said pyramid being open and engaging at its periphery said plate of moderator material.

3. A device for measuring neutron current densities of a determined neutron spectrum, comprising a measuring probe responsive to impinging neutrons, a plate made of moderator material and located on one side of the measuring probe, and a concave neutron reflector forming with said plate a chamber surrounding said probe and spaced from said probe by air, said plate having a plurality of blind bores formed therethrough and distributed over its area and directed toward the measuring probe.

4. A device for measuring neutron current densities of a determined neutron spectrum, comprising a measuring probe responsive to impinging neutrons, a plate made of moderator material and located on one side of the measuring probe, and a concave neutron reflector forming with said plate a chamber surrounding said probe and spaced from said probe by air, the interior of said plate having a plurality of annular grooves with conical surfaces formed therein and extending toward said measuring probe.

5. A device for measuring neutron current densities of a determined neutron spectrum comprising a measuring probe responsive to impinging neutrons, a plate made of moderator material and located on one side of the measuring probe, and a concave neutron reflector forming with said plate a chamber surrounding said probe and spaced from said probe by air, said plate having a symmetrical pattern of bores formed therethrough and distributed over its area and pointing toward the measuring probe.

References Cited

UNITED STATES PATENTS

| | | | |
|---|---|---|---|
| 2,522,522 | 9/1950 | Krasnow | 250—83.6 |
| 2,680,201 | 6/1954 | Scherbatzkoy | 250—83.1 X |
| 2,752,505 | 6/1956 | Klick | 250—83 |
| 3,056,028 | 9/1962 | Mattingly | 250—108 |
| 3,141,092 | 7/1964 | Weinberg | 250—83.1 X |
| 3,210,541 | 10/1965 | Cropper et al. | 250—106 |

RALPH G. NILSON, *Primary Examiner.*

S. ELBAUM, *Assistant Examiner.*